Feb. 25, 1958

J. Z. DE LOREAN 2,824,631

SLIP DRIVE TRANSMISSION

Filed April 7, 1954

INVENTOR.
JOHN Z. DELOREAN
BY
Wilson, Redrow, and Gaines
HIS ATTORNEYS

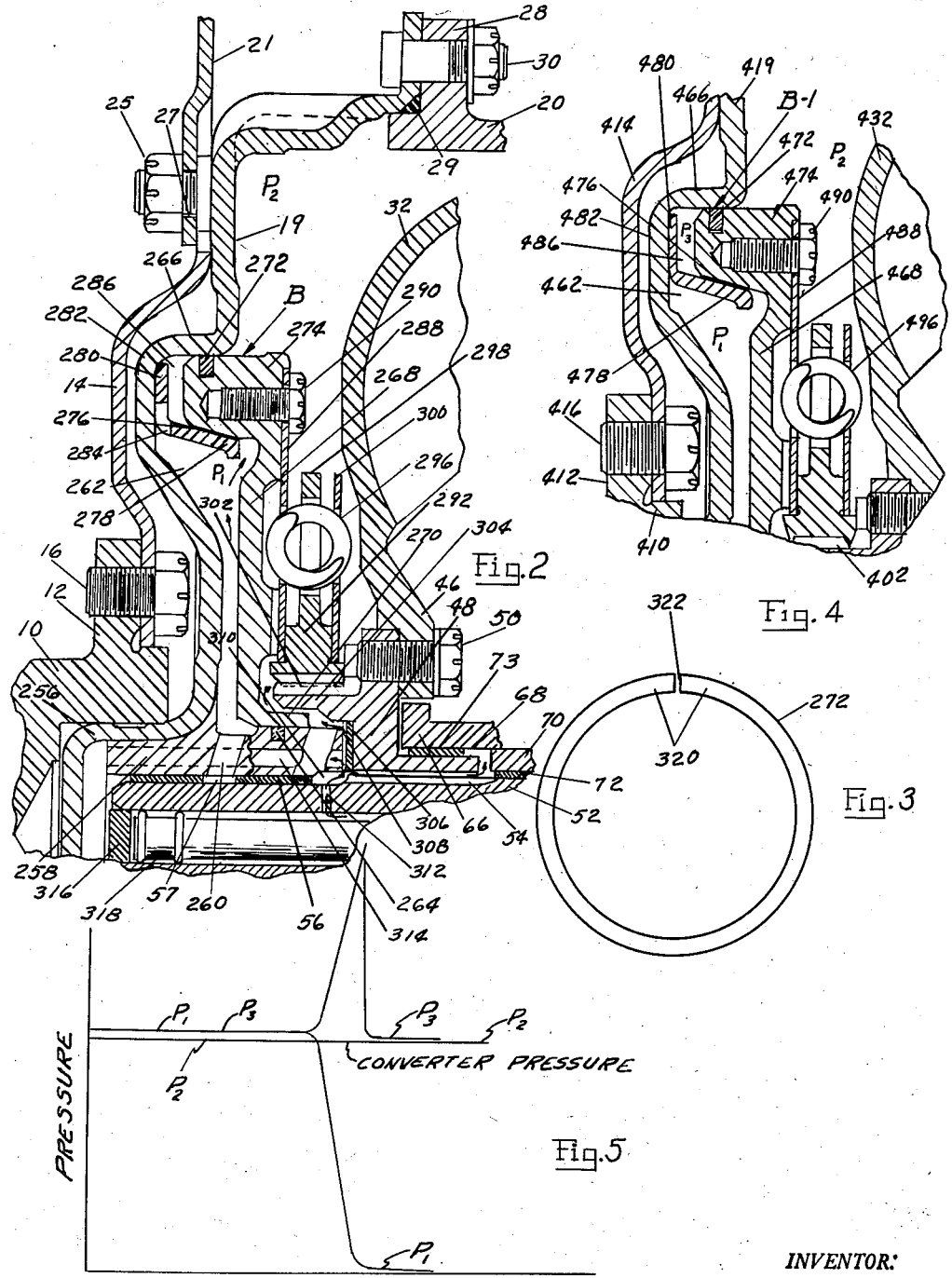

United States Patent Office 2,824,631
Patented Feb. 25, 1958

2,824,631

SLIP DRIVE TRANSMISSION

John Z. De Lorean, Detroit, Mich., assignor to Studebaker-Packard Corporation, a corporation of Michigan Application April 7, 1954, Serial No. 421,599

30 Claims. (Cl. 192—3.2)

The present application relates to slip drive transmissions suitable for automotive uses among others and particularly relates to a simplified direct drive clutch for a torque converter type transmission and to a fluid control system therefor.

Various slidable piston and cylinder type clutch control arrangements have heretofore been proposed in which the slidable piston is made rotatably fast to an axially stationary cylinder with which it cooperates and which in their conventional form are internally pressurized in operation to cause movement of relative separation of the piston with respect to the cylinder so as to clamp an interposed disk or other clutch face piece between one end of the clutch piston and an axially stationary reaction piece or stop thereadjacent. The provision of the latter piece burdens the internally pressurized systems with the inherent disadvantage of constituting an extra but necessary part for taking up the reactive thrust of the clamping operation and limiting travel of the movable member as it moves in a direction tending to separate from the cylinder member. Elimination of the reactive piece is realizable however in internally depressurized or vacuum type piston and cylinder constructions wherein the piston and cylinder are relatively rotatable to one another and move to approach one another and make physical contact in direct compression when actuated such that no true separating operation between the piston and cylinder and no three part clamping action is involved as with clutch engagements of the previously considered type in which two parts actually clamp a third part therebetween. One known depressurized type construction hitherto proposed employs a diaphragm like driven member having a frictionally faced outer periphery at one side thereof adjacent and independently rotating axially stationary end wall and functions in the manner of a check valve such that the diaphragm flexes out of its own plane at one side and the outer periphery seals off the adjacent area of the end wall whenever depressurized at that side and frictionally engages the same so as to be directly driven by the rotating end wall. No true piston and cylinder behavior however is achieved under these circumstances of employing the depressurization principle and there is the disadvantage that the rapidity and positiveness of action available in true piston and cylinder approach operation is not fully realizable either from a structural standpoint or realizable in function.

An object of the invention herein presented is the provision of a piston and cylinder actuated clutch arrangement wherein the foregoing disadvantages are overcome and wherein the piston and cylinder are relatively rotatable and approach one another to effect engagement in direct compression when actuated so as to eliminate need for a reaction piece or stop for limiting travel as with more conventional clamp acting separable piston and cylinder clutch arrangements.

Another object is to provide a collapsing type piston and cylinder actuated clutch arrangement in accordance with the foregoing object and having remotely operated control valving for controlling the piston so as instantaneously to separate the piston and cylinder and disengage the clutch at the will of the operator.

A further object of the invention at least in accordance with one embodiment thereof is the provision of a collapsing type piston and cylinder clutch control as defined in the preceding object wherein an auxiliary chamber formed between the piston and cylinder during engagement permits the escape of fluid therefrom as it collapses, in the manner of a reluctantly or slowly acting dash-pot and thus limits the rate of engagement of the relatively rotating piston and cylinder.

Another object is to provide, in a pressurized housing for torque converter elements, a pair of relatively reciprocal hollow parts which may for instance comprise a cylinder member and a member which will fit therewithin as already described, and each of which is connected to a different torque converter element within the housing and carries a clutch portion engageable with the clutch portion on the other part to bring the torque converter elements into conjoint rotation together. According to a feature of the invention one such member and its connected torque converter element have a disk like clutch damper plate and damper springs interposed in the connection therebetween to soften the clutching action.

A further object of the invention is the provision of a pair of telescopically related hollow parts within a torque converter housing as defined in the preceding object, and having at least one of the parts rigidly formed and so sealed as to be completely bodily shiftable toward the other without deformation and fluid lag attendant with the usual deformation or oil-canning process incident to parts flexure.

Further features, objects and advantages will either be specifically pointed out or become apparent when for a better understanding of the invention reference is made to the following written description taken in conjunction with the accompanying drawings in which:

Figure 2 is a fragmentary view to enlarged scale of the direct drive clutch of Figure 1 and its immediate environment;

Figure 3 is a face view of a seal ring employed in the clutch of Figures 1 and 2;

Figure 4 is a fragmentary longitudinal sectional view corresponding to Figure 2 but showing a modification of the clutch; and Figure 5 is a graphic study of the fluid pressures existing within and about the clutch of Figure 4 plotted against time.

Figure 1:
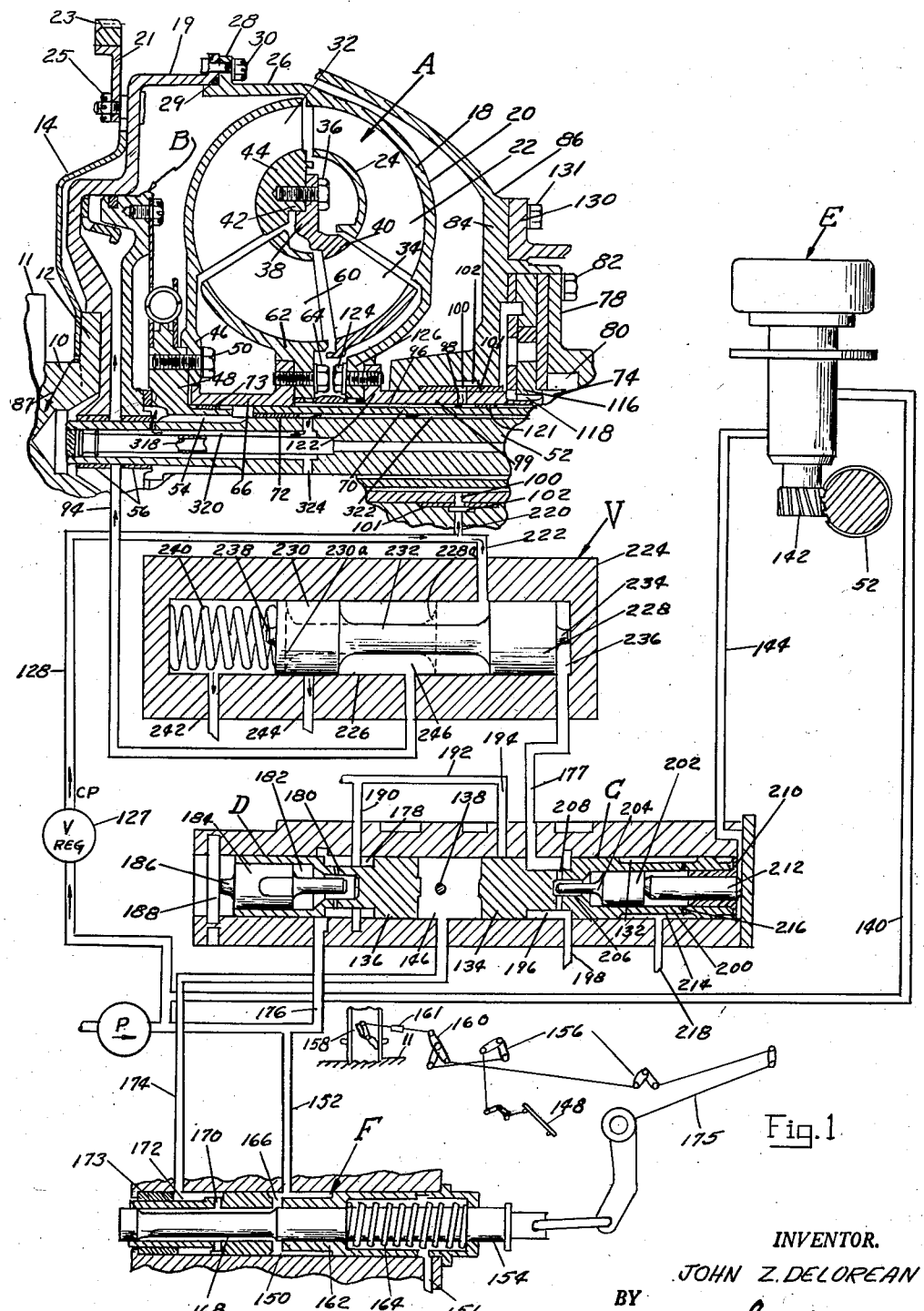
Figure 1 is a schematic fluid circuit system in accordance with the present invention for controlling a direct clutch in a torque converter.

In Figures 1 and 2 of the drawings, a crank shaft or transmission driving shaft 10 rotatably mounted within an engine 11 is provided with a flange 12 supporting a thinly webbed disk 14 which is secured thereto in any convenient manner as by a set of screws 16 and which occupies the structural position ordinarily assumed by a bulkier and thicker flywheel in simple transmissions. A fluid slip drive device indicated at A and constituting a portion of a transmission may be in the form of a two element fluid coupling of the pump and runner type, but as actually shown is disclosed in the form of a fluid filled four element torque converter provided with a fluid energizing driving impeller or pump 18 enclosed in a fluid containing two-section housing having a cylinder-forming front section 19 and a rear section 20 forming an outer shell for the impeller 18 which includes a set of fluid deflecting vanes 22 secured between the shell and an inner shroud 24.

The shell forming rear section 20 is provided with a cylindrical forwardly directed extension 26 terminating in a radially outwardly extending flange 28 adapted to be secured fluid tight to a companion flange on the front section 19 as by a fluid seal connection at 29 and a set of bolt fasteners 30.

A starting gear ring 21 which mounts a set of starting gear teeth 23 is disposed adjacent the cylinder forming front section 19 of the housing and cooperates with a radially extending portion of the latter to clamp the outer periphery of the flywheel like disk 14 therebetween as by a set of threaded bolt fasteners 25 each passing through a set of registering apertures 27 formed in each of the three parts thus clamped together.

An energy absorbing turbine or runner is associated with the impeller 18 and is provided with a first stage section 32 having an inlet adapted to be positioned adjacent the outermost area or outlet of the impeller 18. The first stage turbine section 32 may be secured to a second stage section 34 of the turbine in any suitable manner as by a set of screws 36 projecting through a flange 38 carried by an inner shroud 40 of the second stage turbine 34 and extending into a boss 42 carried by an inner shroud 44 of the first stage turbine 32. It will be of course understood that the first and second stage sections 32, 34 of the turbine member may be secured together against relative rotation in any other convenient manner. The first stage section 32 of the turbine is preferably provided with an inwardly extending flange 46 adapted to be secured to a hub 48 as by a set of screws 50. The hub 48 is secured to a driven shaft 52 in any convenient manner as by a set of meshed fluid conducting inner and outer splines 54. The driven shaft 52 is axially aligned with respect to the driving shaft 10 and has one end journaled for rotation with respect thereto in a pair of axially spaced apart pilot bushings 56 which define an annular space 57 therebetween.

The torque converter A is provided with a set of guide vanes forming a reaction member 60 preferably disposed between the first and second stage turbine sections 32, 34 in diametrically opposed relationship to the vaned pump 18. An outer shell 62 for the reaction member 60 is secured as by a set of screws 64 to the flange of a sleeve-like hub 66 which in turn in secured as by welding 68 to a rotatable hollow shaft 70 the forward end of which is centered for independent rotation on the driven shaft 52 as by a sleeve bearing 72. The sleeve hub 66 is similarly piloted in a bearing bushing 73 supported by a tubular reduced extension on the hub 48. A hub 74 integral with the rear end of the hollow shaft 70 is connected to a stationary pump end wall member 78 by a set of one-way sprag brake elements 80. The stationary member 78 is secured as by a set of screws 82 to a rear end wall 84 of a stationary front piece of a two-piece transmission case 86 surrounding the torque converter A as illustrated. The vaned reaction member 60 is restrained from rotating in the backward direction in the fluid circuit through the action of the one-way brake 80 when backwardly directed forces are exerted thereon by the circulating fluid as the slip drive device A is operated to transmit power with increased torque at reduced speed. The forward direction of rotation is indicated by an arrow 87 about the crankshaft 10 and the reaction member 60 and the hollow shaft 70 rotate in this forward direction on the one-way brake 80 when the device A is operating as a slip-drive fluid coupling to transmit torque in a substantially 1:1 ratio from the driving shaft 10 to the driven shaft 52 without effective multiplication of torque and with as much as 15% slip in the drive.

A straight 1:1 slip free torque ratio drive results when a mechanical lock-up clutch such as the mechanical clutch B is employed so as to drive in parallel with and lock up the drive path so as to disengage the torque converter A. The clutch B is disposed between the driving member or shaft 10 and the driven shaft 52 in a manner to interconnect the impeller and turbine members 18, 32, thereby interrupting or disengaging the operation of the torque converter A and the normally high torque lower speed ratio drive afforded thereby and functions to transmit torque directly from the driving shaft 10 to the driven shaft 52 at a 1:1 or slip free speed ratio.

Clutch actuating fluid for the clutch B may be transmitted thereto or vented therefrom in a manner hereinafter described more in detail and finds its source for the introduction thereof under pressure in a series of interconnected passageways beginning with an adjacent supply pipe 94. Fluid under pressure for the converter A is introduced thereto through a series of interconnected sets of passageways one at 96 extending longitudinally, another at 98 extending radially through the side of a hollow pump driving shaft 99 which forms the outside wall of the longitudinal passage 96, another at 100 defined by a pair of spaced apart bearing bushings 101, and an annular recess 102 formed in the transmission case end wall 84. Such pressure may be supplied from a fluid pump having an impeller 116 driven through a set of splines 118 by means of the pump driving shaft 99 having the set of radial passages 98 formed therein and having an intermediate bearing bushing 121 therefor supported by the sleeve 70 and having a flange 122 connected as by a set of screws 124 to an inwardly directed flange 126 of the impeller web or shell 20. It will of course be apparent that to permit the engine 11 to be started by pushing the vehicle in which the transmission is installed, a second pump may be provided and driven by a driven shaft such as the shaft 52. These pumps may be connected to a common fluid pressure supply gallery if desired.

In an effort to simplify the disclosure of the present invention a source of fluid pressure is indicated diagrammatically at P in Figure 1. It will of course be apparent that this source of fluid pressure may include one or more pumps as stated above and that it may be maintained under constant pressure as afforded by a pressure regulator valve for instance at 127. In the example illustrated the source of fluid pressure P develops a substantially constant pressure of the order of 85 to 95 p. s. i. as measured in an outlet line 128 leading from the constant pressure valve 127 which is series connected with the pump P.

The two-piece transmission case 86 has a rear piece 130 bolted as by a set of screws 131 to the rear end wall 84 of the forward piece of the case.

Control valve mechanism bolted to the bottom of the rear case piece 130 of the transmission 86 may be provided for controlling engagement and disengagement of the direct drive clutch B.

Schematically illustrative of one example of such control valve mechanism is a clutch control valve V shown in Figure 1 in association with a set of parts listed as follows: C, D, E, and F. The just listed set of parts other than in their association with the clutch control valve V form no per se part of the present invention and are separately shown and described in the co-pending application of Carroll J. Lucia, Serial No. 258,771, now Patent No. 2,728,427, assigned to the assignee of the present application. For the sake of ready reference by way of background material for the operation of the clutch control valve V, however, a description of the function and structure of the parts C, D, E, F associated therewith complete at least to the following extent is presented as a matter of convenience at this point.

The just noted parts C and D constitute individual valving having a mutual unitary body providing a common cylinder 132 wherein the parts C and D individually function as a combined direct drive shift valve C and a pressure regulating or modulating valve D respectively. Their common cylinder 132 is of constant diameter throughout its length in spite of its dual function and thus minimizes machining and manufacturing costs. The direct drive shift valve C and the modulating valve D include a pair of independently shiftable spaced apart plungers 134 and 136 which are slidably mounted for movement toward and away from a stop 138 extending transversely across the cylinder 132 to limit movement of each of the plungers in its motion of approach toward the other. The plunger 134 of the direct drive shift valve C is movable toward the left from a solid line clutch disengaging position illustrated by solid lines in Figure 1 to a clutch engaging final position wherein the plunger 134 engages the stop 138. Fluid pressure to urge the plunger 134 into clutch engaging position toward the stop 138 is provided by a governor E having a conduit 140 communicating with the source of fluid pressure P. The governor has a gear 142 driven by a driven shaft such as the shaft 52 to supply fluid pressure proportionate to vehicle speed through a conduit 144 to the right hand end of the cylinder 132. In the example illustrated the governor E is calibrated to deliver fluid under pressures ranging from 31 to 61 p. s. i. to the plunger 134 of the direct drive shift valve at vehicle speeds of 15 to 55 M. P. H. respectively and is more completely shown and described in the co-pending application of Warren G. Bopp, Serial No. 412,691, assigned to the assignee of the present application. Likewise, the governor shutoff valve function is therein more completely shown and described and the following is given as an example of the opening and closing speeds of the governor shutoff valve which operates independently of the governor modulating function: opening speed is 12 M. P. H. and over and shutoff occurs at 12 M. P. H. and under.

Movement of the plunger 134 into the direct drive position toward the stop 138 is opposed by fluid pressure exerted in a chamber 146 disposed between the plungers 134 and 136 and occupied by the stop 138. The pressure exerted in the chamber 146 emanates from an accelerator pedal actuated valve F and is proportionate to the speed increasing position of an accelerator pedal 148. In the example illustrated the pressure in the chamber 146 ranges from approximately 26 p. s. i. to 58 p. s. i. The accelerator pedal actuated valve F has a cylinder 150 vented at 151 and communicating through a conduit 152 with the source of fluid pressure P. A plunger 154 slidably related to the cylinder 150 is connected through a linkage 156 with the accelerator pedal 148 which also actuates a throttle controlling linkage 160 connected through a spring loaded lost motion connection 161 to a throttle valve 158 mounted in an induction manifold of the engine 11. A sleeve 162 is slidably mounted on the plunger 154 and is yieldably urged by a spring 164 toward the left hand position to increase communication between a set of radiating fluid inlet ports 166 in the sleeve 162 and a section 168 of reduced diameter of the plunger 154 which communicates through a set of radiating ports 170 in the sleeve 162 with a section 172 of reduced diameter of the sleeve 162. An abutment in the form of a sleeve 173 is secured stationarily within the end of the cylinder 150. The section of reduced diameter 172 of the sleeve 162 is connected through a conduit 174 with the chamber 146 of the cylinder 132 between the direct drive shift valve C and the modulating valve D. In the operation of the accelerator pedal actuated valve F it will be noted that as the accelerator pedal 148 is moved in the engine speed increasing direction toward the left as viewed in Figure 1 the throttle valve 158 is pulled open in a clockwise direction and the plunger 154 is pulled toward the right owing to counterclockwise rotation of a plunger connected shaft 175 to increase the communication between the set of fluid inlet ports 166 and the section of reduced diameter 168 of the plunger 154. Fluid introduced from the pump P flows through the ports 170 to the section of reduced diameter 172 of the sleeve 162 and urges the sleeve to move toward the right as viewed in Figure 1 in opposition to the continuous bias of the spring 164 to reduce communication between the inlet conduit 152 and the section 168 of reduced diameter of the plunger 154. It will thus become apparent that for every position of the accelerator pedal 148 the valve F develops a proportionate fluid pressure and exerts it through the conduit 174 to the chamber 146 of the direct drive shift valve C and the modulating valve D. Fluid pressure to actuate the direct drive clutch control valve V is supplied by a conduit 177 which leads from the direct drive shift valve C.

The source of fluid pressure P communicates through a conduit 176 with the cylinder 132 of the modulating valve D. The plunger 136 in the valve D is provided with a section 178 of reduced diameter communicating through a set of radial ports 180 therein with an elongated internal cylinder 182 formed in the plunger 136. A vent valve 184 having a projection 186 on the outside end thereof adapted to engage a stop member 188 in the cylinder 132 is slidably mounted within the plunger 136 to trap fluid in the internal cylinder 182 thereby exerting a force urging the plunger 136 toward a position to the right in which the stop 138 is engaged in opposition to fluid pressure from the accelerator pedal actuated valve F exerted in the chamber 146. Inasmuch as the pressure admitted to the cylindrical chamber 182 through the radial ports 180 emanates directly from the source of fluid pressure P and is therefore of a higher order than the modulated pressure exerted in the chamber 146 from the accelerator pedal actuated valve F, the plunger 136 will be fluid shifted to the right to reduce communication between the conduit 176 communicating with the source of fluid pressure P and the section of reduced diameter 178 of the plunger 136. A resultant pressure is thus maintained in the section 178 of reduced diameter which is proportionate to the speed increasing position of the accelerator pedal 148 but of a higher order than the pressure exerted in the chamber 146 from the accelerator pedal actuated valve F. This pressure is directed through a set of series connected conduits 190, 192 and 194 to the cylinder 132 of the direct drive shift valve C adjacent the conduit 177 leading to the clutch control valve V for the direct drive clutch B. The plunger 134 of the direct drive shift valve C has a section 196 of reduced diameter proportioned in such a manner that when the plunger 134 is in the right hand solid line position illustrated by solid lines in Figure 1 the conduit 177 leading to the direct drive controlling clutch valve V communicates with a vent passage 198 in the cylinder 132 as illustrated to permit the valve V to open and cause disengagement of the clutch B in a manner hereinafter described. The right hand end of the plunger 134 has a cylindrical bore 200 which receives a piston 202 having an elongated nose 204 adapted to project into a section 206 of reduced diameter of the cylindrical bore 200 which communicates through a set of radial ports 208 with the section 196 of reduced diameter of the plunger 134. The right hand end of the plunger 134 is provided with a sleeve 210 affixed thereto as by welding or soldering and forming a guide for a solid cylindrical spacer member 212. The plunger 134 is provided with a second section of reduced diameter 214 and a set of radially disposed vent ports 216 communicating with the cylindrical bore 200 between the piston 202 and the sleeve 210 to permit the escape of trapped fluid through a vent passage 218 in the cylinder 132.

In short, the operation of the just described parts C, D, E, and F is as follows. With the engine 11 running at idling speed the throttle valve 158 is maintained in the idling position whereupon relatively low fluid pressure of the order of 26 lbs. per square inch is effective in the direct drive shift valve C as controlled by the accelerator pedal actuated valve F. This pressure urges the plunger 134 of the direct drive shift valve C toward the solid line right hand position illustrated by solid lines in Figure 1 to vent the clutch controlling valve V through the conduit 177, the section of reduced diameter 196 of the plunger 134, and the vent passage 198, the valve V being thereby permitted to be open for causing the clutch B to be maintained in disengaged position.

As the accelerator pedal 148 is moved to accelerate the engine 11, the impeller 18 of the torque converter A energizes the fluid within the housing section 20 and directs it to the turbine sections 32 and 34 to drive the driven shaft 52, the reaction member 60 of the torque converter being locked against reverse rotation by the one-way brake 80 to redirect the fluid to transmit power from the driving shaft 10 to the driven shaft 52 with an increase of torque. At the engine produced vehicle speeds between approximately 15 to 55 M. P. H. the governor E driven by a driven shaft such as the shaft 52 receives fluid pressure from the source P and directs progressively increasing modulated pressure ranging from approximately 31 to 61 p. s. i. through the conduit 144 to urge the plunger 134 of the direct drive shift valve C toward the left hand position in opposition to the pressure ranging from 26 to 58 p. s. i. exerted on the left hand end of the plunger 134 in the chamber 146 from the accelerator actuated valve F. As the governor modulated pressure overcomes the modulating pressure from the accelerator pedal actuated valve F the plunger 134 including the piston 202, the sleeve 210, and the spacer member 212, are progressively shifted toward the left as viewed in Figure 1. When the plunger 134 shifts far enough to the left that the section of reduced diameter 196 first communicates with the conduit 194 from the modulating valve D, fluid ranging in pressure from 40 to 85 p. s. i. in the example illustrated is directed through the conduit 177 to the clutch controlling valve V to close the same and cause the clutch B to engage, the fluid at the same time flowing through the set of radial ports 208 in the plunger 134 and exerting pressure in the cylindrical bore 200 forwardly of the piston 202. The piston 202 and the spacer member 212 move rearwardly to the solid line position illustrated by solid lines in Figure 1 whereupon modulating fluid pressure from the valve D is exerted in the section 206 between the forward end of the piston 202 and the rear surface of the cylindrical bore 200 thereby exerting an auxiliary force urging the plunger 134 toward the left hand or finally secured clutch actuating position of engagement with the stop 138.

Erratic engagement and disengagement of the clutch controlling valve V and the clutch B due to hunting or oscillatory movement of the plunger 134 is thus prevented by means of this additional securing pressure existing in the area of the section 206 of reduced diameter of the piston 202 and exerted against the interior of the plunger 134 forming the chamber or bore 200. Fluid pressure for the clutch controlling valve V in the line 177 leading from the direct drive shift valve C is actually supplied from the modulating valve D through the conduit 194 and thus is proportionate to the speed increasing position of the accelerator pedal 148 but of a higher order than the pressure supplied by the accelerator pedal actuated valve F such for example as ranging from 40 to 85 p. s. i. In certain instances such proportionate pressure offered by the modulating valve D may desirably be utilized for providing the pressure differential necessary to engage the direct drive clutch B but as shown however in Figure 1 the pressure differential utilized for engaging the direct drive clutch B is based on the substantially constant reference pressure in the conduit 128 supplied by the constant pressure regulating valve 127.

The conduit 128 supplies a pair of branches indicated respectively at 220 and 222 the latter of which forms an inlet to a body 224 for the clutch controlling valve V. The valve body 224 has a smooth cylindrical bore 226 of uniform diameter within which a shiftable valve is slidably mounted having a pair of end spools 228, 230 disposed in spaced apart relationship and connected by a valve midportion 232 of reduced diameter. The right hand spool 228 according to Figure 1 has a protruding stop 234 which engages an end wall of the valve body 224 and cooperates therewith to define a fluid pressure chamber 236 supplied by the conduit 177 leading from the direct shift valve C and charged with the pressure produced by the modulating valve D. The valve spool 230 at the opposite end has a protruding stop 238 disposed within one end of a coil spring 240 which occupies a chamber vented at 242 and mutually defined by the spool 230 and a corresponding end of the bore 226 in the valve body 224. The spring 240 seats against just noted end of the valve body 224 and continually urges the spools 230, 228 into the open position of the valve. In open position of the valve the spool 230 covers a vent 224 which is spaced apart from the vent 242. The portion of reduced diameter 232 of the valve V defines an annular chamber 246 with which the conduit 94 is in communication at one end at all times whereas the opposite end of the conduit 94 is in continuous communication with the space included between the adjacent pilot bushings 56 provided for the driven shaft 52. Under pressure of fluid from the modulating valve D exerted in the conduit 177 leading to the valve V, the spools 228 and 230 are urged in a direction to the left from the chamber 236 so as to assume the dotted line positions shown by the dotted lines 228a and 230a respectively in Figure 1. In such instance the spool 228 covers the fluid inlet 222 and the conduit 94 is connected through the annular space 246 to the vent 244 and in the thus closed valve position the clutch B is caused to engage.

The branch 220 of the conduit 128 leading from the constant pressure regulating valve 127 communicates with the annular recess 102 adjacent the included space 100 between the bushings 101 connected to the radially inwardly directed passage 98 and the space 96 extending axially between the pump diving shaft 99 and the hollow shaft 70 within and concentric therewith. The axially extending included space 96 communicates with the converter A through radial ports to the space between the rows of opposed screws 64, 124 and is led into the space between the second stage turbine 34 and the reactor member 60 so as to charge the chambers inside of and outside of the converter A within the housing 19, 26. Owing to pressure losses from turbulence within the converter A the pressure in the chamber immediately adjacent the front section 19 of the converter housing will be slightly lower than the pressure produced at the outlet of the constant pressure regulating valve 127.

In the vicinity of the spaced apart pilot bushings 56 at the front end of the driven shaft 52 the front section 19 has a cylindrical hub portion 256 within which a hub sleeve 258 is press fitted so as to be rendered axially and rotatably fast thereto. The hub sleeve 258 has one or more radial openings 260 which communicate pressure fluid from the included space 57 between the pilot bushings 56 supplied by the conduit 94 and into a clutch actuating chamber 262 which is bounded on its inner periphery by the hub sleeve 258 having a seal 264. The clutch chamber 262 is bounded at its outer periphery by an annular cylindrical step portion 266 formed integrally in the front housing section 19 and within the resulting clutch chamber 262 a slidable clutch piston 268 is fitted. The inner seal 264 slidably engages a cylindrical hub flange 270 formed on the inner periphery of the clutch piston 268 and a ring seal 272 is carried in laterally offset enlarged outer peripheral portion 274 of the piston 268 for slidably engaging the cylindrical inner surface of the annularly stepped portion 266 of the forward housing section 19. On the inner portion of its outer periphery the clutch piston 268 is provided with a layer of friction wear surface material 276 of frusto conical form which is complemental to a companion surface likewise indicated at 276 and formed on a fluid pervious conical ring 278 having a radiating flange 280 secured to a laterally offset radiating portion 282 provided by the front housing section 19 and joined integrally to the cylindrical portion 266 thereof. The conical ring 278 is rendered fluid pervious by having a plurality of circumferentially spaced apart openings 284 therein which establish communication between the clutch chamber 262 and a smaller tapered ring-like chamber 286 mutually defined by the laterally offset enlarged outer periphery of the piston 268, the conical ring 278, and the cylindrical portion 266 of the front housing piece 19. The outer peripheral portion 274 of the clutch piston 268 has a damper type clutch disk 288 fixedly secured thereto as by a plurality of screws 290. The clutch disk 288 is operably connected to a clutch disk hub 292 through an elastic coupling such as offered by a plurality of clutch damper coil springs 296 positioned in known manner in a set of circumferentially extending slots formed between a flange 298 carried by the hub 292 and the disk 288, a disk 300 being secured to the disk 288 as by a set of rivets and having a set of similarly disposed circumferentially extending slots to balance the driving forces exerted on the springs 296. By means of a pair of relatively slidable sets of outer and inner spline teeth 302, the hub 292 at its inner periphery is rendered axially slidable to but made rotatably fast with an extension 304 formed on the runner connected hub 48. The hub 48 and the previously considered hub sleeve 258 include an interposed thrust bearing disk 306 which is provided with a series of circumferentially spaced apart radiating grooves 308 whereby lubricant is introduced to the spline teeth 302. Lubricant supplied thereto and to the splines 54 and the bearings 72, 73 is introduced through an annular chamber 310 at the rear of the pilot bushings 56 from a series of radiating passages 312 formed in the driven shaft 52. Lubricant from the chamber 310 is led forwardly through a series of axially extending passages 314 formed in the hub sleeve 258 and into the center of the hub portion 256 for the forward converter housing piece 19.

A press fit plug 316 closes off the forward end of the driven shaft 52 which is hollow in the interior thereof to receive a tubular closure member 318. The tubular closure member 318 cooperates with the hollow interior of the driven shaft 52 to define a path 320 (Figure 1) for lubricant which inter-communicates with a lubricant supplied included annular space 322 between the driven shaft 52 and the hollow shaft 70, the intercommunicating connection being effected through a series of radiating ports 324 formed in the side of the shaft 52. As previously noted the pressure within the interior of the front housing section 19 is slightly less than the pressure produced at the constant pressure regulator valve 127 and is of the order of a few pounds less than the previously mentioned 85 to 95 p. s. i. delivered by the valve 127. Thus this lesser pressure hereinafter referred to as $P_2$ is slightly less than the pressure normally existing in the clutch chamber 262 hereinafter referred to as $P_1$. Accordingly the pressure in the tapered annular recess 286 will be sufficiently higher than the pressure within the main interior of the front housing piece 19 that the clutch B will tend to remain disengaged at all times at which the clutch controlling valve V is in its rightward open position shown in solid lines in Figure 1. On the other hand venting of the piston actuating chamber 262 due to closing operation of the valve V generates a resulting fluid pressure differential which is created across the piston 268 and is effective for bodily shifting the piston slidably into clutching position so as to effect engagement between the engageable surfaces 276. The continuously effective seals maintained about the piston at 272 and 264 render this bodily shiftable clutch actuation movement almost immediate and thus the resulting collapse of the chamber 262 upon venting is almost immediate. During the period at which the sealed surfaces of the clutch piston 268 slide along the inner and outer seals 264, 272 as the clutch piston 268 bodily shifts axially into its two opposite engaging and disengaging positions, the corresponding relative sliding movement between the spline teeth 302 at the damper hub 292 permits full utility of the damper springs 296 without binding therein and the resulting freedom from binding allows the clutch damper springs 296 to operate to full advantage in softening the clutching action, particularly during clutch engagement movement of the clutch B. On the damper side of the clutch B, the entire face of the piston 268 at that side is continuously exposed to the pressure $P_2$ from the converter, both directly and through the hydraulically parallel paths through the spring receiving slots in the spring carrying disks 288, 300 and through the spline teeth 302. Thus the continuously sealed outer and inner peripheral portions 270, 274 of the clutch piston 268 are both fluid urged to shift bodily therewith during fluid clutching action of the clutch B and likewise they are fluid urged in the opposite axial direction during clutch disengagement action of the clutch B.

Disengagement of the clutch B by repressurizing the chamber 262 may be effectuated by either of two methods. First, at speeds below 12 m. p. h. the governor pressure is reduced to zero owing to the fact that the governor E occupies its closed or shutoff position preventing governor pressure from reaching the line 144 leading to the direct shift valve C and at the same time venting the line 144, all as more completely shown and described in the noted co-pending Bopp application Serial No. 412,691. Accordingly the unopposed residual throttle pressure available in the chamber 146 in the direct shift valve C is sufficient to move the plunger 134 therein to the solid line rear position shown in solid lines in Figure 1 and vent the conduit 177 through the vent passage 198. Therefore, at speeds of 12 m. p. h. and under, the torque converter A is automatically rendered operable and the clutch B is retained in the disengaged position irrespective of the relative position of the throttle actuated valve F. That is to say, the venting of the conduit 177 through the vent 198 causes the chamber 236 to depressurize and permit the valve spring 240 in the valve V to restore the valve spools 230, 228 to their open position. Accordingly the conduit 94 leading to the clutch chamber 262 is disconnected from the vent 244 in the valve V and reconnected to the line pressure at 222 so as to resume the nominal value $P_1$ which is slightly in excess of the nominal pressure $P_2$ maintained within the front housing section 19 of the converter chamber.

The second method for shifting the clutch B from engaged to disengaged position so as to re-engage the converter A is accomplished by depressing the accelerator pedal 148 to a kickdown position beyond the full throttle or wide open position of the throttle valve 158 as accommodated by the lost motion connection indicated at 161 between the linkage 160 for controlling the throttle and the trottle valve 158. Such overtravel or kickdown position of the accelerator pedal 148 causes the plunger 154 in the throttle actuated valve F to be retracted and fully drawn to the right within the cylinder 150 whereupon the sleeve 162 also moves rightwardly due to increase of pressure in the chamber defined by the section 172 of reduced diameter of the sleeve 162. This pressure increase arises due to the opening movement by the plunger 154 with respect to the supply line connected radial inlet ports 166 and the increase of pressure causes the return spring 164 to be compressed thereby subjecting the chamber 146 of the direct drive shift valve C to substantially the full line pressure exerted in the pump supplied conduit 152. The full line pressure which results in the chamber 146 in the direct drive shift valve C overcomes the modulated speed governed pressure applied by the governor E to the rear of the plunger 134 in the direct drive shift valve C and urges the plunger 134 to the solid line position shown in solid lines in Figure 1 so as to vent the chamber 236 in the clutch control valve V and open the same so as to re-pressurize the clutch piston chamber 262 to the pressure value of $P_1$ where $P_1$ slightly exceeds the converter housing pressure $P_2$ previously referred to. Restoration of the accelerator pedal 148 from overtravel position to the normally occupied range between and including full throttle and closed or meager throttle, permits the accelerator actuated valve F to seek its normal modulating positions creating reduced pressures in the range of 26 to 58 p. s. i. which the governor modulated pressures at 144 are capable of overcoming, as previously noted, to cause leftward shift of the valve C and reengagement of the clutch B.

In Figure 3 a full face view of the seal 272 is shown which is carried by the outer periphery of the piston 274 and which continuously engages the cylindrically formed portion 266 of the front converter housing piece 19. The sealing ring 272, preferably formed of spring steel, is of one piece construction having a single diametrically extending split between the adjacent end portions 320 thereof so as to define a gap 322. Owing to the presence of the point of separation defined in the gap 322 the steel ring 272 may be in effect wound into place in its seat in an annular groove in the enlarged periphery 274 of the piston 268 and the attendant fluid leakage resulting through the gap is of so slight a magnitude as to be relatively negligible from stand-point of the operation of the entire hydraulic system here involved.

In the operation of the clutch B of the preceding Figures 1 through 3, the effect of the inner and outer seals 264, 272 which cooperate with the piston is such as to render the clutch action rather rapid and positive in its engagement. Thus during the normal driving conditions of acceleration where as a joint function of throttle governed pressure and speed governed pressure the clutch B is caused to engage so as to lock out the torque converter A and provide a 1:1 drive between the crank shaft 10 and the driven shaft 52, the clutch B positively and directly couples the latter shafts together and even though the bind-free spring dampers 296 are effective to reduce shock it may be found advantageous under certain circumstances to provide a modification in the clutch B so as to produce a somewhat even softer or smoother clutch engagement.

Such modification is shown according to the embodiment of a corresponding clutch B–1 in Figures 4 and 5 wherein slightly different but advantageous other features of clutch operation and structure are offered in addition to the softer clutching action. Similarly to the embodiment of Figures 1 through 3, the modification B–1 of Figure 4 has a flywheel like disk 414 secured as by a set of screws 416 to a flange 412 on a crank shaft 410. A forward piece 419 of a two-piece converter housing is suitably secured to the flywheel like disk 414 as by screws and has an annularly stepped cylindrical portion 466 which is integrally formed with a laterally offset radial portion 482 so as to form the peripheral edge of a clutch actuating cylinder or chamber 462. A clutch piston 468 is coupled to a converter runner turbine element 432 through a mechanical path including a set of splines 402, an elastic spring coupling 496, and a pair of riveted together clutch disks one of which is indicated at 488 and is secured to the piston as by a set of screws 490. A set of opposed frusto conical friction faces indicated at 476 is arranged such that a friction wear surface is carried by a laterally offset enlarged peripheral portion 474 of the piston and the companion metal surface is formed on a fluid impervious conical ring 478 having a radial flange 480 solidly welded to the radial portion 482 of the front housing piece 419.

Another set of opposed frusto conical friction faces, similar to and concentric with the faces 476 but tapering in the opposite direction, may be provided between the cylinder portion 466 and the adjacent outside surface of the laterally offset peripheral portion 474 of the piston so as to provide two simultaneously acting sets of friction engaging surfaces or else only one or the other of these two sets may actually be provided for clutching purposes, and in fact according to the illustrative example of Figure 4 only the inner set 476 is shown whereas on its outer surface the laterally offset piston portion 474 is annularly grooved to receive a sealing ring 472 similar to the construction of Figure 3 and like the construction of Figure 2 being engaged with the cylindrical portion 466 of the front housing part 419.

The points of structural similarity between the principal embodiment of Figures 1 through 3 and the modification B–1 of Figure 4 diverge at the foregoing note in the description wherein it is stated that the welded frusto conical piece 478 is impervious to fluid, that is to say it has no openings therethrough corresponding to the openings 284 of the principal embodiment. Thus in the embodiment of Figure 4 there is no free path of access for the communication of fluid between the piston actuating chamber 462 and the tapered ring-like chamber 486 defined by the disk 478, the cylindrical portion 466 of the front housing piece 419, and the enlarged peripheral portion 474 of the piston 468. In fact as the two friction engaging surfaces 476 are brought into contact they form an uninterrupted annularly continuous sealing area of contact which prevents the escape of pressure fluid therepast from the wedge shaped chamber 486 and the piston actuating chamber 462. The only means of escape for any fluid trapped within the chamber 486 following the point of actual clutch engagement and immediately prior thereto is through the annular gap between adjacent ends of the seal 472 which as noted is similar to the seal 272 of Figure 3. Accordingly the venting operation of the piston actuating chamber 462 is attended by the fact that fluid is trapped in the chamber 486 and is only slowly vented or bled therefrom into the area of the interior of the front housing piece 419 in which the prevailing internal pressure $P_2$ is indicated in Figure 4.

This bleeding action in effect produces a dash-pot function affording only gradual or soft clutch engagement at B–1. A more graphic understanding of the softer clutch engagement operation is perhaps best understood if the pressure within tape ring ring-like chamber 486 is assigned the value $P_3$ and fluid body within the piston actuating chamber 462 is assigned the pressure value $P_1$, all in comparison to an assigned datum pressure $P_2$ existing within the main body of fluid in the converter adjacent the front housing piece 419.

In Figure 5 these pressure changes occurring during movement of the clutch B–1 from disengaged to engaged position are illustrated by means of a graph wherein pressure values are plotted against units of elapsed time. The converter pressure indicated at $P_2$ will be seen from Figure 5 to be initially slightly less than the pressure maintained at $P_1$ in the chamber 462 and the curve representing the pressure $P_3$ in the annular recess 486 will be located approximately in the region between the two pressure lines $P_2$ and $P_1$ and may in fact coincide with one or the other thereof, probably the latter as shown. Under such conditions, the piston 268 is rendered substantially dynamically stable in a hydrostatically balanced state between the positive proportional opposed pressures $P_1P_3$ vs. $P_2$ thereacross which though being practically equal, create a slight differential insuring that the friction engaging surfaces 476 are held out of contact by a small amount. Separation of the surfaces 476 is limited owing to the abutting engagement between the two adjacent hubs which carry the splines 402. Clutch engagement, on the other hand, results from the creation of a dynamically unstable state of the piston 268 wherein it becomes hydrostatically unbalanced when the chamber 462 is vented. At the time of clutch engagement occurring due to the transitional step of venting the pressure $P_1$ within the piston actuating chamber 462, the resulting fluid differential across the piston 468 drives the same to the left causing a quantity of fluid to be trapped in the annular recess 486 whereupon the internal pressure $P_3$ thereof will rise steadily upward inversely to the change of pressure at $P_1$ which is simultaneously dropping during this period of transition. The converter pressure $P_2$ will be maintained during this transition period at a substantially constant value. Progressive leakage of the fluid trapped in the chamber 486 past the gap between the adjacent ends of the seal 472 will gradually bleed off the pressure in the chamber 486 such that its internal pressure $P_3$ will gradually approach and eventually reduce to the value of the pressure $P_2$ in the converter. During such period of transition however the clutch engaging function will be momentarily delayed and will only become gradually effective whereby a relatively soft clutch engagement will manifest itself, particularly as contributed to by the operation of the damper springs 496. Under stabilized static conditions at the end of the transition period of clutching, the pressure $P_1$ will be zero, the pressure $P_3$ in the chamber 486 will approximate or equal the pressure $P_1$ in the main converter area, and the annularly continuous friction engaging surfaces 476 will effectually seal the chambers 486 and 462 from one another.

As herein disclosed the clutches B and B–1 are shown incorporated in a plural element slip drive device of the torque converter type wherein four fluid connected elements are employed. It is evident that torque converters having fewer or more elements than four may be utilized in conjunction with the present clutches and that a simple two element fluid coupling or other pressurized fluid drive device may embody one of the present clutches to advantage. So also the drawing shows a set of clutch damper springs 296, 496 in the respective embodiments disclosed but self-evidently the springs may be omitted in either or both of these embodiments and particularly the embodiment of Figure 4 which is already characterized by an inherently dash-pot slowed, relatively soft clutch engaging action. In Figure 4 the controlled pressure bleeding or leakage action from the dash-pot chamber 486 is accounted for by the presence of a space or gap between adjacent ends of the diametrically split seal 472 but indeed it is not essential to the invention that any seal be employed at all in the position of the seal 472, but if used, additional or separate bleed off passages may be employed in addition to the provision for bleeding through or leakage past the seal and actually with the provision of such separate bleed off passages an annularly continuous fluid tight seal may be employed by which seal leakage is materially reduced or largely eliminated.

Variations within the spirit and scope of the present invention are equally comprehended by the foregoing description.

What is claimed is:

1. For use with a multi-element slip drive device including at least fluid connected pump and runner elements, a housing therefor having a main chamber for receiving the device adapted to be charged with fluid and including a pump connected member and a runner connected piston member disposed in closely spaced adjacency with their respective central portions in axial alignment, said pump-connected member forming a piston receiving end cylinder and together with the piston member being relatively shiftable to one another in an axial direction and in a direction about their common axis and having their central portions of a relatively relieved formation to define a pressure expansible and ventably collapsible piston operating fluid chamber radially within the outer periphery of the piston member, a continuously effective seal between the main and piston operating chambers carried by the piston member at its outer periphery and continuously sealing the same to and engaging the cylinder member, a continuously effective seal between the main and piston chambers and sealed to and engaging the inner periphery of the central portion of the piston member, two friction engaging surfaces carried by the piston and cylinder members respectively which when engaged due to depressurization and relative collapse of the piston chamber between the members frictionally hold the same together for conjoint rotation, means of communication for forming separate fluid passages between a source of pressure fluid and each of said main and piston operating chambers within the housing, and single valve means included in the means of communication for selectively opening to introduce pressure fluid into the passage for the piston chamber and creating back pressure therewithin or venting and depressurizing the piston chamber to collapse the same causing engagement between the two friction engaging surfaces.

2. For use with a multi-element slip drive transmission including at least impeller and turbine elements, a housing therefor having a main chamber adapted to be charged with fluid and including an impeller connected member forming an end cylinder and a turbine connected piston member disposed in closely spaced adjacency with respect to the cylinder member with their respective central portions in axial alignment, said piston and cylinder members being relatively shiftable to one another in an axial direction and in a direction about their common axis and having their central portions formed so as to be relatively relieved to define an included pressure expansible and ventably collapsible piston operating fluid chamber disposed radially within the outer periphery of the piston member, seals in the vicinity of the outer and inner peripheries of the piston member separating the main and piston operating chambers, two friction engaging surfaces carried by the respective piston and cylinder members which when engaged due to depressurization and relative collapse of the piston chamber between members frictionally hold the same together for conjoint rotation, means of communication for forming separate fluid passages between a source of pressure fluid and each of said main and piston chambers, servo-mechanism included in the means of communication for being selectively actuated to introduce pressure fluid into the passage for the piston chamber creating back pressure therewithin or actuated to vent and depressurize the piston chamber to collapse the same and effect engagement between the two friction engaging surfaces, and means for actuating the servo-mechanism as a joint function of power and speed of the transmission including a throttle connected means for creating a first fluid force and a governor connected means for creating an opposing fluid force.

3. For use with a multi-element slip drive device including at least impeller and turbine elements, a housing therefor having a main chamber adapted to be charged with fluid and including an impeller connected member and a turbine connected piston member disposed in closely spaced adjacency with their respective central portions in axial alignment, said impeller connected member forming an end cylinder for receiving the piston member and said piston and cylinder members being relatively shiftable to one another in an axial direction and in a direction about their common axis and having their central portions formed so as to be relatively relieved to define an included axially expansible and collapsible piston operating fluid chamber radially within the outer periphery of the piston member, annularly effective seals in the vicinity of the outer and inner peripheries of the piston member separating the main and piston chambers, two friction engaging surfaces mounted to the respective piston and cylinder members which when engaged due to depressurization and relative collapse of the piston chamber between members connect the same together for conjoint rotation, means of communication for forming separate fluid passages between a source of pressure fluid and each of said main and piston chambers, and valve means included in the means of communication for selectively opening to introduce pressure fluid into the passage for the piston chamber and creating back pressure therewithin or venting and depressurizing the piston chamber to collapse the same and effect engagement between the two friction engaging surfaces, said friction engaging surfaces being of complemental frusto conical shape as mounted to the respective piston and cylinder members and engageable to form a third annual seal between the main and piston chambers.

4. For use with a multi-element slip drive device comprising two or more fluid connected elements including a driver, a housing therefor having a main chamber for the fluid connected elements in the device and adapted to be charged with fluid and containing a driver connected member forming an end cylinder, a piston member having means for drivingly connecting the same to at least one of the remaining elements for enforced rotation and being disposed in closely spaced adjacency with respect to the cylinder member with their respective central portions in axial alignment, said members being relatively shiftable with respect to one another in an axial direction and in a direction about their common axis and having their central portions each formed so as to be relatively relieved for mutually defining an included axially expansible and collapsible piston controlling fluid chamber radially within the outer periphery of the piston member, a seal in the vicinity of each of the outer and inner peripheries of the piston member separating the main and piston chambers, said piston and cylinder members having means to interconnect the same including two friction engaging surfaces which when engaged due to depressurization and relative collapse of the piston controlling chamber included between the members connect the same together for conjoint rotation, means of communication for forming separate fluid passages between a source of pressure fluid and each of said main and piston chambers, and a part included in the means of communication for selectively opening to introduce pressure fluid into the passage for supplying the piston chamber and creating back pressure therewithin or closing for venting and depressurizing the piston chamber to collapse the same for effecting engagement between the two friction engaging surfaces.

5. For use with a multi-element slip drive device including at least fluid connected pump and runner elements, a housing therefor having a main chamber adapted to be charged with fluid and including a pump connected member forming an end cylinder, a runner connected piston member disposed in closely spaced adjacency thereto with their respective central portions in axial alignment, said cylinder and piston members being relatively shiftable to one another in an axial direction and in a direction about their common axis and having their central portions of a relatively relieved formation to define an axially pressure expansible and ventably collapsible piston operating fluid chamber radially within the outer periphery of the piston member, a continuously effective seal between the main and piston chambers carried by the piston member at its outer periphery and continuously sealing the same to and engaging the cylinder member, a continuously effective seal between the main and piston chambers and sealed to and engaging the inner periphery of the central portion of the piston member, two friction engaging surfaces which are carried by the piston and cylinder members respectively and which when engaged due to depressurization and relative collapse of the piston chamber between the members connect the same together for conjoint rotation, means of communication for forming first and second separate fluid conducting passages between a source of pressure fluid and each of said main and piston chambers respectively and effective during periods to pressurize said first passage for conducting fluid to the main chamber, single valve means included in the second passage in said means of communication for opening selectively during such periods to introduce pressure fluid into the second passage for conducting fluid to the piston chamber and creating back pressure therewithin or selectively venting the second passage during such periods and depressurizing the piston chamber to collapse the same causing engagement between the two friction engaging surfaces.

6. For use with a multi-element slip drive device including at least fluid connected pump and runner elements, a housing therefor having a main chamber for receiving the device and adapted to be charged with fluid, a pump connected member and a runner connected piston member included therein and disposed in closely spaced adjacency to one another with their respective central portions in axial alignment, said pump connected member forming a piston receiving end cylinder and together with the piston member being relatively shiftable to one another in an axial direction and in a direction about their common axis and having their central portions of a relatively relieved formation to define a pressure expansible and ventably collapsible piston operating fluid chamber radially within the outer periphery of the piston member, there being means to clutch together the piston and cylinder members for conjoint rotation including two friction engaging surfaces which when engaged due to depressurization and relative collapse of the piston chamber between members connect the same for conjoint rotation, means of communication for forming separate fluid passages between a source of pressure fluid and each of said main and piston operating chambers, and valve means included in the means of communication for selectively opening to introduce pressure fluid into the passage for the piston chamber and creating back pressure therewithin or venting and depressurizing the piston chamber to collapse the same causing engagement between the two friction engaging surfaces.

7. For use with a multi-element slip drive device including at least fluid connected pump and runner elements, a housing therefor having a main chamber adapted to be charged with fluid and including a pump connected member forming an end cylinder, a runner connected piston member disposed in closely spaced adjacency to the cylinder member with their respective central portions in axial alignment, said cylinder and piston members being relatively shiftable to one another in an axial direction and in a direction about their common axis and having their central portions of a relatively relieved formation to define an axially pressure expansible and ventably collapsible piston operating fluid chamber radially within the outer periphery of the piston member, means for interconnecting the piston and cylinder members for rotation together comprising two friction engaging surfaces which when engaged due to depressurization and relative collapse of the piston chamber between the members connect the same together for conjoint rotation, and valve controlled means of communication forming first and second separate fluid conducting passages between a source of fluid pressure and each of said main and piston chambers respectively and effective to introduce fluid pressure from said first passage to the main chamber or to introduce fluid pressure from both said passages simultaneously into each of their respective chambers.

8. For use with a multi-element slip drive device including at least impeller and turbine elements, a housing therefor having a main chamber adapted to be charged with fluid and including an impeller connected member forming an end cylinder and a turbine connected piston member disposed in closely spaced adjacency with respect to the cylinder member, said piston and cylinder members being relatively shiftable to one another in an axial direction and in a direction about their common axis and having their central portions formed so as to be relatively relieved to define an included pressure expansible and ventingly collapsible piston operating fluid chamber radially within the outer periphery of the piston member, seals in the vicinity of the outer and inner periphery of the piston member continuously separating the main and piston chambers, two friction engaging surfaces carried by the respective piston and cylinder members which when engaged due to depressurization and relative collapse of the piston chamber between members connect the same together for conjoint rotation, means of communication for forming separate fluid passages between a source of pressure fluid and each of said main and piston chambers, and a single valve included in the means of communication for selectively opening to introduce pressure fluid into the passage for the piston chamber and creating back pressure therewithin or venting and depressurizing the piston chamber to collapse the same under the force of pressure fluid in the main chamber and effect engagement between the two friction engaging surfaces carried by the members.

9. For use with a multi-element slip drive device including at least impeller and turbine elements, a housing therefor having a main chamber adapted to be charged with fluid and including an impeller connected member forming an end cylinder and a turbine connected piston member disposed in closely spaced adjacency with their respective central portions in axial alignment, said piston and cylinder members being relatively shiftable to one another in an axial direction and in a direction about their common axis and having their central portions formed so as to be relatively relieved to define an included axially expansible and collapsible piston operating fluid chamber radially within the outer periphery of the piston member, two seals in the vicinity of the outer and inner peripheries of the piston member separating the main and piston chambers, two friction engaging surfaces mounted to the respective piston and cylinder members which when engaged due to depressurization and relative collapse of the piston chamber between members connect the same together for conjoint rotation, and simultaneously form a third seal between the two seals between the main and piston chambers, means of communication for forming separate fluid passages between a source of pressure fluid and each of said main and piston chambers, and single valve means included in the means of communication for selectively opening to introduce pressure fluid into the passage for the piston chamber and creating back pressure therewithin or venting and depressurizing the piston chamber to collapse the same and effect engagement between the two friction engaging surfaces.

10. For use with a multi-element slip drive device including at least impeller and turbine elements, a housing therefor having a main chamber adapted to be charged with fluid and including an impeller connected member and a turbine connected piston member disposed in closely spaced adjacency, said impeller connected member forming an end cylinder for receiving the piston member, said piston and cylinder members being relatively shiftable to one another in an axial direction and in a direction about their axes and having their central portions formed so as to be relatively relieved to define an included axially expansible and collapsible fluid chamber therebetween, seals in the vicinity of the outer and inner periphery of the piston member separating the main and included chambers, two friction engaging surfaces mounted to the respective piston and cylinder members which when engaged due to relative collapse of the included chamber between members connect the same together for conjoint rotation, and means for creating a pressure differential across said piston to shift the same axially in the direction of said cylinder member to collapse the included chamber.

11. For use with a multi-element slip drive device including at least impeller and turbine elements, a housing therefor having a main chamber adapted to be charged with fluid and including an impeller connected member forming an end cylinder and a turbine connected piston member disposed in closely spaced adjacency with their respective central portions in axial alignment, said piston and cylinder members being relatively shiftable to one another in an axial direction and in a direction about their common axis and having their central portions formed so as to be relatively relieved to define an included axially expansible and collapsible piston operating fluid chamber radially within the outer periphery of the piston member, seals in the vicinity of the outer and inner peripheries of the piston member forming cylindrically disposed areas of sliding sealing contact separating the main and piston chambers, two friction engaging surfaces mounted to the respective piston and cylinder members which when engaged due to depressurization and relative collapse of the piston chamber between members connect the same together for conjoint rotation, and means of communication for forming separate fluid passages between a source of pressure fluid and each of said main and piston chambers, said friction engaging surfaces being of complementary frusto conical shape as mounted to the respective piston and cylinder members and engageable to form a tapered area of sealing contact between the main and piston chambers.

12. For use with a multi-element slip drive device including at least impeller and turbine elements, a housing therefor having a main chamber adapted to be charged with fluid and including an impeller connected member and a turbine connected second member disposed in closely spaced adjacency with their respective central portions in axial alignment, said impeller connected member forming an end cylinder for receiving the second member and said second and cylinder members being relatively shiftable to one another in an axial direction and in a direction about their common axis and having their central portions formed so as to be relatively relieved to define an included axially expansible and collapsible controlling chamber radially within the outer periphery of the second member, and a seal in the vicinity of at least one of the outer and inner peripheries of the second member and separating the main and controlling chambers, there being means for rotatably and axially connecting said members comprising two friction engaging surfaces which when engaged due to depressurization and relative collapse of the controlling chamber between members connect the same together for conjoint rotation, said friction engaging surfaces being formed of complemental frusto conical shape on the respective cylinder and second members.

13. For use with a multi-element slip drive device including at least impeller and turbine elements, a housing therefor having a main chamber adapted to be charged with fluid and including an impeller connected member and a turbine connected second member disposed in closely spaced adjacency thereto with their respective central portions in axial alignment, said impeller connected member forming an end cylinder for receiving the second member and said second and cylinder members being relatively shiftable to one another in an axial direction and in a direction about their common axis and having their central portions formed so as to be relatively relieved to define an included fluid expansible and collapsible controlling chamber radially within the outer periphery of the second member, a seal in the vicinity of at least one of the outer and inner peripheries of the second member separating the main and controlling chambers, two friction engaging surfaces carried by the respective second and cylinder members which when engaged due to depressurization and relative collapse of the controlling chamber between members connect the same together for conjoint rotation, and means of communication for forming separate fluid passages between a source of pressure fluid and each of said main and second chambers and having a common portion from which the separate passages emanate, said friction engaging surfaces being formed of complemental frusto conical shape as carried by the respective cylinder and second members.

14. For use with a multi-element slip drive device comprising two or more fluid connected elements including a driver, a housing therefor having a main chamber for the fluid connected elements in the device and adapted to be charged with fluid and containing a driver connected member forming an end cylinder, a piston member having means for drivingly connecting the same to at least one of the remaining elements for enforced rotation and being disposed in closely spaced adjacency with respect to the cylinder member with their respective central portions in axial alignment, said members being relatively shiftable with respect to one another in an axial direction and in a direction about their common axis and having their central portions each formed so as to be relatively relieved for mutually defining an included axially expansible and collapsible piston controlling fluid chamber radially within the outer periphery of the piston member, a seal in the vicinity of each of the outer and inner peripheries of the piston member separating the main and piston chambers, said piston and cylinder members having means to interconnect the same including two friction engaging surfaces which when engaged due to depressurization and relative collapse of the piston controlling chamber included between the members connect the same together for conjoint rotation, means of communication for forming separate fluid passages between a source of pressure fluid and each of said main and piston chambers, a part included in the means of communication for selectively opening to introduce pressure fluid into the passage for supplying the piston chamber and creating back pressure therewithin or closing for venting and depressurizing the piston chamber to collapse the same for effecting engagement between the two friction engaging surfaces, fluid directing means for exerting an actuating pressure tending to effectuate the closed position of said selectively openable and closable part with a force that corresponds to magnitude of speed of one of the friction engaging surfaces, and fluid directing means for exerting an opposing force that corresponds to magnitude of power available to the drive device for transmission therethrough.

15. For use with a plurality of fluid connected elements forming a slip drive device for comprising at least driver and driven elements, a housing having a main chamber receiving the fluid connected elements forming the drive device and adapted to be charged with fluid and containing a driver connected member forming an end cylinder, and a second member having means for elastically coupling the same through splines to the driven element for axially shiftable cushioned conjoint rotation therewith and being disposed in closely spaced adjacency with respect to the cylinder member with their respective central portions in axial alignment, said members being relatively bodily shiftable with respect to one another in an axial direction and in a direction about their common axis and having their central portions formed so as to be relatively relieved to define an included axially expansible and collapsible fluid operated controlling chamber, said second member having a slidably related seal in the vicinity of at least one of the peripheries thereof separating the main and controlling chambers and slidably accommodating bodily shift of the second member in the axial direction aforesaid, there being means for rotatably and axially interconnecting the members comprising two friction engaging surfaces which when engaged due to depressurization and relative collapse of the controlling chamber included between the members connect the same together for conjoint rotation.

16. For use with a plurality of fluid connected elements forming a slip drive device and comprising at least driver and driven elements, a housing having a main chamber for receiving the fluid connected elements forming the drive device and adapted to be charged with fluid, said housing including a driver connected member at one end forming a housing end cylinder, a second member having means for elastically coupling the same through splines to the driven element for axially shiftably cushioned conjoint rotation therewith, said members being relatively rotatable in a direction about their common axis and said second member being bodily shiftable toward the cylinder member to effect engagement between mutually engageable limiting means thereon in an axial direction, said members being relatively relieved in the vicinity of their central portions to define an included axially expansible and collapsible fluid operated controlling chamber, and a slidably related seal in the vicinity of at least one of the peripheries of the second member and separating the main and controlling chambers and slidably accommodating bodily shift of the second member in the axial direction aforesaid with respect to the cylinder member, said mutually engageable limiting means comprising two friction engaging surfaces which when engaged due to depressurization and relative collapse of the controlling chamber included between the members connect the same together for conjoint rotation.

17. For use with a plural element slip drive device comprising at least two fluid connected driver and runner elements, a housing therefor having a main chamber for the fluid connected elements in the device and adapted to be charged with fluid and containing a driver connected member forming an end cylinder, a second member bodily shiftable with respect to the cylinder member and to the driven element, and an elastic coupling device between the second member and the runner having runner connected attachment splines for rendering the device generally free of the runner for movement in an axial direction but fast thereto against relative movement in a direction about the axis, thereby coupling together the runner and the bodily shiftable second member for cushioned conjoint rotation, said cylinder member being arranged to receive the shiftable second member and said members having their central portions formed so as to be relatively relieved to define an included fluid expansible and collapsible controlling chamber closed by the outer periphery of the second member, a seal in the vicinity of at least the inner one of the peripheries of the shiftable member and sealably separating the main and controlling chambers at all times, there being means for rotatably and axially interconnecting the cylinder and shiftable members comprising two friction engaging surfaces which when engaged due to depressurization and relative collapse of the controlling chamber included between the members interrupt relative rotation and axial travel therebetween.

18. For use with a plural element slip drive device comprising at least two fluid connected driver and runner elements, a housing therefor having a main chamber for the fluid connected elements in the device and adapted to be charged with fluid and comprising a driver connected member forming an end cylinder, a second member bodily shiftable with respect to the cylinder member and to the driven element within the housing, and an elastic coupling device between the second member and the runner element having runner connected attachment splines for rendering the device generally free of the runner for movement in an axial direction but fast thereto against relative movement in a direction about the axis, thereby coupling the runner and the bodily shiftable second member for cushioned conjoint rotation together, said cylinder member being arranged to receive the shiftable second member therewithin and said members having their central portions formed so as to be relatively relieved to define an included fluid expansible and collapsible controlling chamber closed by the outer periphery of the second member, there being means for rotatably and axially interconnecting the cylinder and shiftable members comprising two friction engaging surfaces which when engaged due to depressurization and relative collapse of the controlling chamber included between the members interrupt relative rotation and axial travel therebetween.

19. For use with a multi-element slip drive device comprising at least two fluid connected driver and driven elements, a housing therefor having main chamber for the fluid connected elements in the device and adapted to be charged with fluid and containing a driver connected member forming an end cylinder, a piston member having means for elastically coupling the same to the driven element for cushioned conjoint rotation therewith and being disposed in closely spaced adjacency with respect to the cylinder member with their respective central portions in axial alignment, said members being relatively bodily shiftable with respect to one another in an axial direction and in a direction about their common axis and having their central portions formed so as to be relatively relieved to define an included axially expansible and collapsible piston operating fluid chamber radially within the outer periphery of the piston member, a seal in the vicinity of at least one of the outer and inner peripheries of the piston member and sealingly separating the main and piston chambers, two friction engaging surfaces mounted to the respective piston and cylinder members which when engaged due to depressurization and relative collapse of the piston chamber included between the members connect the same together for conjoint rotation, and single valve means connected to the piston operating fluid chamber for selectively opening to introduce pressure fluid thereinto for creating back pressure therewithin or venting and depressurizing the piston chamber to collapse the same and effect engagement between the two friction engaging surfaces.

20. For use with a plurality of fluid connected elements forming a slip drive device and comprising at least relatively rotatable driver and driven elements, a housing therefor having a main chamber for receiving the fluid connected elements forming the drive device and adapted to be charged with fluid and incorporating a driver connected structure forming an axially stationary end cylinder, an elastically inter-coupled structure mounted for bodily shiftable movement in an axial direction within the housing adjacent the axially stationary cylinder structure, spline means carried by a portion of the shiftable structure for attachment to the driver element so as to have freedom of movement for axial travel with respect to the latter but rotatably affixed thereto, and clutch means for coupling together the shiftable structure and the cylinder structure constituted by two single frusto conical friction engaging surfaces one of which is fluid shiftable axially for conjoint movement in two directions with the shiftable structure and the other of which is axially stationary with and formed within the cylinder structure and both of which when cooperatively engaged hold the shiftable and cylinder structures rotatively and axially together, said cylinder structure forming one side of a clutch controlling chamber adjacent the main chamber and between which the two friction engaging surfaces when engaged form a fluid tight seal.

21. For use with a slip drive device having a splined fluid driven element, a containing housing having a main chamber of general toroidal shape adapted to be filled with a body of circulated fluid, a pair of relatively reciprocal hollow parts telescopically receivable one within the other to define an included space at one end of the main chamber adapted to contain a quantity of fluid separate from the main body of fluid and varying in volume dependent upon the movement of reciprocation between the parts, there being a dynamically stable condition of maximum space of separation between the parts wherein one part is in a substantial state of hydrostatic balance and a dynamically unstable transition condition of hydrostatic unbalance tending to cause movement of approach of the parts to collapse the space, there being a clutch portion which is connected to each of the parts and which when mutually engaged for holding the parts for rotation together separate the fluid containing space between parts into inner and outer chambers sealed thereby fluid tight from one another, means connected to the inner chamber for venting the fluid contained in the included space to collapse the latter causing engagement between the clutch portions, a seal between parts at the periphery of the outer chamber for trapping fluid therein and restricting the rate of escape of the trapped fluid between the main chamber and the outer of the two separated chambers during engagement between the clutch portions so as to limit the rate of engagement therebetween; and means affixed to the innermost part for attachment to the splines of the driven element to provide for conjoint rotation between the innermost part and the driven element; said last named means including an elastic element forming a torsionally elastic drive transmitting damper.

22. For use with a slip drive device having a splined fluid driven output element, a containing housing having a main chamber of general toroidal shape adapted to be filled with a body of circulated fluid, a pair of relatively reciprocal hollow parts cooperating to define a space at one end of the housing adapted to contain a quantity of fluid separate from the main body of fluid and varying in volume dependent upon the movement of reciprocation between the parts, there being a clutch portion which is connected to each of the parts and which when mutually engaged for holding the parts together separate the fluid containing space between parts into inner and outer chambers sealed thereby fluid tight from one another, means connected to the inner chamber for venting the pressure of the fluid contained in the aforesaid space to collapse the latter and cause engagement between the clutch portions, a seal between parts of the periphery of the outer chamber for trapping fluid therein and restrictively passing the fluid between the main chamber and the outer of the two separated chambers during engagement between the clutch portions so as to limit the rate of engagement therebetween, and means affixed to one of the parts for attachment to the splines of the output element to provide for continued conjoint rotation between the one part and the driven element.

23. For use with a fluid slip drive device, a containing housing having a main chamber of a general toroidal shape adapted to contain a body of toroidally circulating fluid, a pair of relatively reciprocal relatively rotatable hollow parts cooperating to define a space at one end of the housing adapted to contain a quantity of fluid separate from the main body of fluid and varying in volume dependent upon the movement of reciprocation between the parts, there being a clutch portion which is connected to each of the parts and which when mutually engaged for holding the parts together separate the fluid containing space between parts into inner and dash-pot chambers sealed thereby fluid tight from one another, means connected to the inner chamber for venting the fluid contained in the space between parts to collapse the latter and cause engagement between the clutch portions, and a seal between parts at the periphery of the dash-pot chamber for trapping fluid therein and only restrictively bleeding the pressure between the main and dash-pot chambers during engagement between the clutch portions so as to limit the rate of engagement therebetween.

24. For use with a slip drive device having a splined fluid driven element, a containing housing having a main chamber of a general toroidal shape adapted to be occupied by a body of circulating fluid, a pair of independently rotatable reciprocally related hollow parts cooperating to define a space at one end of the housing adapted to contain a quantity of fluid separate from the main body of fluid and varying in volume dependent upon the movement of reciprocation between the parts, there being a clutch portion which is connected to each of the parts and which when mutually engaged for holding the parts for rotation together separate the fluid containing space between parts into inner and outer chambers sealed thereby fluid tight from one another, means connected to the inner chamber for venting the fluid contained in said space to collapse the latter and cause engagement between the clutch portions, fluid confining means between parts defining a restricted bleed passage at the periphery of the outer chamber for trapped fluid therewithin and restrictively passing the fluid therefrom to the main chamber during engagement producing movement between the clutch portions so as to limit the rate of engagement therebetween, and means affixed to the innermost part for attachment to the splines of the driven element to provide for conjoint rotation between the innermost part and the driven element, said means including clutch spring damper elements providing for torsionally elastic transmission of the drive to the driven element.

25. In fluid controlled means for connecting first and second parts carried by different ones of axially aligned relatively rotatable driven and driving shafts, a fluid chamber included between relatively slidably related piston and clutch drive plates, said clutch drive plate having an axially extending first wall portion presenting a cylindrical surface, and having a radially directed wall portion integral with the first wall portion for attachment to the first shaft connected part, said piston plate having a layer of surface material to be clutched, and a wall surface at one side of the piston plate for attachment to the second shaft connected part, and annular means normally biased into engagement with the cylindrical surface on the drive plate and carried by the piston plate at its outer periphery to throttle the flow of fluid away from the included chamber.

26. Chamber controlled means for connecting first and second parts carried by different ones of axially aligned relatively rotatable driven and driving shafts comprising a clutch drive plate forming one side of the chamber, said clutch drive plate having an axially extending first wall portion presenting a cylindrical surface and having a radially directed wall portion connected to the first portion for attachment to the first shaft connected part, a piston plate slidable with relation to the cylindrical surface and forming another side of the chamber, said piston plate having layer means of wear surface material to be clutched and separate means normally biased into engagement with the drive plate and carried by the piston plate to throttle the flow of fluid away from the included chamber.

27. Chamber controlled means for connecting first and second parts carried by different ones of axially aligned relatively rotatable driven and driving shafts comprising a clutch drive plate forming one side of the chamber, said clutch drive plate having an axially extending first wall portion presenting a cylindrical surface and having a radially directed wall portion connected to the first portion for attachment to the first shaft connected part, a piston plate slidable with relation to the cylindrical surface and forming another side of the chamber, said piston plate having a layer of wear surface material to be clutched and a wall portion presenting a side surface for attachment to the second shaft connected part, and annular means normally biased into engagement with one of the plates and carried by the other to throttle the flow of fluid away from the included chamber.

28. Means for connecting axially aligned relatively rotatable driving and driven shafts comprising a clutch drive plate forming one side of a chamber, said clutch drive plate having an axially extending first wall portion presenting a cylindrical surface and having means for connecting the same for rotation with the driving shaft, a piston plate forming the opposite side of the chamber and slidably related to the cylindrical surface, said piston plate having a layer of wear surface material thereupon adapted to be clutched, annular means carried by one of the plates and normally biased into engagement with the other to throttle the flow of fluid away from the included chamber, and an elastic damper device carried by the piston plate and having splined means for attachment to the driven shaft.

29. Means for connecting axially aligned relatively rotatable first and second shafts at least the latter of which is splined, comprising a clutch drive plate forming one wall of a chamber, said clutch drive plate having means for connecting the same for rotation with the first shaft, a piston plate forming the opposite wall of the chamber, said piston plate being axially movable and having a layer of wear surface material thereupon adapted to be clutched, annular means carried by one of the plates and normally biased into engagement with the other to throttle the flow of fluid away from the included chamber, and an elastic damper device carried by the piston plate and having a hub for attachment to the splines of the second and being axially movable with the piston plate.

30. In combination, a clutch drive plate forming one side of a clutch controlling chamber, a piston plate forming the opposite side of the chamber and bodily slidable toward and from the clutch drive plate, clutch wear surface means within the chamber carried by one of the plates and engageable with means on the other of the plates, and separate means normally biased into engagement with one of the plates and carried by the other to throttle the flow of fluid away from the included chamber.

References Cited in the file of this patent
UNITED STATES PATENTS

| | | |
|---|---|---|
| 1,805,081 | Drkyal | May 12, 1931 |
| 2,301,957 | Lang | Nov. 17, 1942 |
| 2,404,657 | Roberts et al. | July 23, 1946 |
| 2,548,207 | Dunn | Apr. 10, 1951 |
| 2,568,007 | Jandasek | Sept. 18, 1951 |